Patented Jan. 3, 1950

2,493,666

UNITED STATES PATENT OFFICE 2,493,666

PHYTATE PURIFICATION

Harry Gehman, Western Springs, and William Hach, Oak Park, Ill., assignors to Corn Products Refining Company, New York, N. Y., a corporation of New Jersey No Drawing. Application May 2, 1945, Serial No. 591,626

8 Claims. (Cl. 260—461)

This invention relates to the purification of crude metal phytates, and more particularly to the purification of such phytates obtained from the liquor known to the corn wet milling industry as corn steepwater.

Metal phytates possess valuable therapeutic and other properties. However, relatively pure phytates are essential or at least highly desirable for practical utilization of such properties. Heretofore it has been extremely difficult to obtain, by any practical or commercially acceptable method, metal phytates possessing the requisite degree of purity.

Commercially such phytates are obtained by precipitation from corn steepwater. However, the crude phytates so obtained contain appreciable quantities of various impurities. In large measure these are proteinaceous impurities. Various attempts have been made to obtain relatively pure phytates from corn steepwater. According to one such method an effort is made to remove proteinaceous materials from the steepwater before the phytates are precipitated therefrom. According to another such method the crude phytate precipitated from the steepwater is dissolved in a medium serving as a selective solvent for the phytate but which does not dissolve the proteinaceous impurities, separation then being effected between the residual phytate solution and the undissolved impurities, and the phytate then being precipitated from such solution. However, methods heretofore proposed for the production of relatively pure phytates obtained from corn steepwater have not been wholly satisfactory either because they are only partially effective for the intended purpose or because they are costly, complicated and impractical.

The present invention relates to a simple, economical and wholly practical method of purifying crude metal phytate obtained as by precipitation from corn steepwater. This method may be employed for the purification of any metal phytate which contains proteinaceous impurities and which is insoluble in and inert with respect to aqueous solutions of strongly alkaline materials. Examples of such phytates are those obtained from corn steepwater by precipitation therefrom by means of calcium and barium compounds.

In broad outline the invention contemplates subjecting the metal phytate which contains proteinaceous materials, which are to be removed, to treatment with an aqueous solution of a strongly alkaline agent. Such treatment may be effected by washing, leaching, extracting or the like, such treatment preferably being effected at elevated temperatures. The proteinaceous impurities dissolved or colloidally dispersed in the treating medium are with such medium then removed from the metal phytate as by filtration, decantation or the like to yield a relatively purified metal phytate.

The metal phytate recovered according to such procedure will, however, require extensive washing to effect removal of residual alkaline agent. This washing procedure may be obviated, however, at least to a large extent by neutralization of the alkaline agent following dissolution or dispersion of the proteinaceous impurities in the treating medium, but prior to separation of such impurities and the treating medium from the residual metal phytate. Neutralization in this manner affords the additional advantage moreover of facilitating the separation of the purified metal phytate from the treating medium.

The purification of crude metal phytate in accordance with the present invention is influenced by the history of the crude material. Referring more particularly to crude metal phytate derived from corn steepwater by the addition to the latter of lime in sufficient quantity to effect precipitation of calcium phytate, the material so obtained should preferably be subjected to purifying treatment as soon as possible following its recovery from the steepwater. Aging of the crude calcium phytate adversely affects the efficacy of the purifying treatment herein described and best results are obtained accordingly when freshly prepared crude metal phytates are treated. Aging of the crude material for several hours or one or two days does not in general affect substantially the efficacy of the purifying treatment but aging for longer periods should be avoided. Aging in the wet state is also to be avoided in order to prevent putrefaction of the proteinaceous impurities which are present in the crude phytate. The adverse effects of aging are particularly noticeable when the crude metal phytate is aged while in the wet state; if the material is aged when in a relatively dry state, the adverse effects of aging are much less pronounced.

However, if the moisture content of the crude metal phytate is to be reduced before the phytate is subjected to purification in accordance with the process herein described, care should be exercised to avoid subjecting the material to temperatures exceeding those at which the proteinaceous impurities present become modified. The moisture content of the crude phytate should preferably, as a practical matter, not be reduced substantially below about 10% to 15% by weight.

Freezing of the crude metal phytate should also be avoided as this also adversely affects the efficacy of the process herein described.

The kind and amount of proteinaceous impurities present in the crude metal phytate also bear upon the efficiency of the herein described purifying process. Generally speaking, the kind and amount of such impurities present depend upon the source of the metal phytate and the history of its production and/or recovery. The present invention contemplates the treatment of crude metal phytates derived from various plant sources, e. g., soya beans, cottonseed, sugar beets, sugar cane, etc. More particularly, the present invention is concerned with the purification of metal phytates derived from the aqueous extract of various cereal grains, notably from corn steepwater. Corn steepwater obtained in the wet milling of corn in conventional manner generally contains about 45% to 50% (dry basis) of water soluble proteinaceous material, and substantial quantities of such material are present in crude metal phytates precipitated from such steepwater by addition of an agent such as lime which will produce water insoluble metal phytate. The purifying process of the present invention may be employed with greatest efficiency when the proteinaceous impurities in the crude metal phytate do not exceed about 30% by weight, dry basis, of the crude metal phytate; however, crude metal phytates containing even greater quantities of proteinaceous impurities may advantageously be subjected to such purifying treatment.

In carrying out the invention, best results are obtained by treating freshly prepared crude metal phytate in the wet state, i. e., containing considerable amounts of water of the order of about 50% to 75% by weight. Crude metal phytate in this condition is obtained, for example, by precipitation thereof from corn steepwater by the addition of lime and separation, as by filtration, of the precipitate. The use of freshly prepared crude phytate obviates danger of adverse effects of aging, freezing, or drying at excessive temperatures. Treatment according to the present invention is advantageously effected when the material under treatment is initially in the wet state. Freshly prepared crude phytate is naturally in this condition. When dried crude metal phytate is to be treated it is advantageous preliminarily to wet the material to increase its moisture content to about 60% or more.

In purifying crude metal phytate in accordance with the present invention, there may be employed any strongly alkaline agent which satisfies certain primary prerequisites. By a strongly alkaline agent is meant one which has a high proton acceptor capacity. The prerequisites to be satisfied are: (a) The alkaline agent must be water soluble to the extent of at least about 0.5 to 1.0 normal; (b) In aqueous solution it must be capable of dissolving or colloidally dispersing proteinaceous materials such as are present in crude metal phytate obtained from plant sources aforementioned; (c) In aqueous solution it must be incapable of dissolving or reacting with the metal phytate sought to be purified and recovered from the process. Among the strongly alkaline agents which in aqueous solution may be employed for purposes of the present invention are sodium hydroxide, potassium hydroxide, sodium carbonate, potassium carbonate and trimethylbenzyl ammonium hydroxide or mixtures thereof. Alkaline agents, such as the hydroxides of calcium and barium, are not sufficiently soluble in water to satisfy the requisites above-mentioned. Nor is ammonium hydroxide, a weak alkali, suitable for purposes of the present invention; it appears to be adsorbed by the crude metal phytate rather than to effect the dissolution or dispersion of the proteinaceous impurities contained therein.

In carrying out the invention the crude metal phytate may be suspended in the treating medium, i. e. in an aqueous solution of a strongly alkaline agent, and the resulting slurry agitated for a sufficient time and at a suitable temperature to effect dissolution or dispersion of the proteinaceous material therein, followed by recovery of the purified phytate, as by filtration, decantation or the like. Alternatively the crude metal phytate may be leached with the treating medium or subjected to extraction with the treating medium, as in a filter press.

The temperature of the treating medium may vary somewhat and may range from room temperature to boiling temperature but in general for practical operation it is preferable to employ the treating medium at or near its boiling temperature. It is particularly advantageous to employ the treating medium at relatively high temperature when the concentration of alkaline agent in the treating medium is relatively low, although it is generally advantageous to employ high temperatures irrespective of whether the concentration of the alkaline agent in the treating medium is high or low. Temperatures substantially above the boiling point of the treating medium are to be avoided as this tends to promote decomposition of the phytate and coagulation of the proteinaceous material.

The concentration of the alkaline agent in the treating medium may vary considerably. Thus, if an aqueous solution of sodium hydroxide is employed as the treating medium, the concentration of the sodium hydroxide contacted with the crude metal phytate may be as low as about 0.33 normal, and as high as about 1.0 normal. For practical operation a concentration of about 0.50 normal sodium hydroxide is preferred, although higher concentrations are not detrimental. Obviously mechanical difficulties or operational hazards will increase with increases in alkaline concentration, even though there may be no adverse effects on the phytate being treated. Other alkaline agents may be used in such concentrations as will produce alkalinity equivalent to the herein specified concentrations obtaining in the case of sodium hydroxide.

The crude metal phytate should be subjected to the action of the treating medium for a period of time sufficient to effect the desired degree of dissolution or dispersion of the proteinaceous impurities. The duration of such treatment will depend somewhat upon the concentration of alkaline agent in the treating medium and also upon the temperature thereof. The factors of time, temperature and concentration of alkaline agent in the treating medium are interrelated, and in general higher concentration and temperatures permit shorter periods of treatment, while lower concentrations and temperatures require longer periods of treatment. The period of treatment will also depend somewhat upon the method employed for contacting the treating medium with the crude metal phytate. Thus, when the crude phytate is suspended in the treating medium, the period of time necessary to effect the desired degree of purification is shorter than when leaching or similar methods of treating are employed. The period of treatment will also depend somewhat upon the amount of proteinaceous impurities in the crude metal phytate undergoing treatment; greater amounts tend to require treatment for longer periods in order to effect purification to the desired degree. The period of treatment will also depend somewhat upon the history of the phytate undergoing treatment, freshly prepared phytate in the wet state requiring less time than phytate which has been frozen, dried or the like. In general the treating time required, depending upon the particular conditions of treatment employed, need not be substantially greater than of the order of 10 to 20 minutes. Treatment for longer periods, however, will not affect the process adversely provided the temperature does not exceed substantially the boiling point of the treating medium at atmospheric pressure.

After the metal phytate has been subjected to the action to the treating medium, it may be recovered therefrom in relatively pure form by filtration, decantation or the like, followed by washing with water to remove residual treating medium. It has been found, however, to be advantageous to subject the phytate to treatment with an acidic substance after the proteinaceous impurities initially present have been dissolved or dispersed in the treating medium. When purification is effected by suspending the phytate in the treating medium, the acidic substance may be added before separation of the phytate from the treating medium. Generally the treating medium will be employed at an elevated temperature as above indicated; the acidic substance may be added to the suspension either while the latter remains at elevated temperature or after it has cooled. When purification is effected by leaching the phytate with the treating medium, the leached phytate may be further leached with an aqueous solution of an acidic substance prior to final washing of the purified phytate. Utilization of an acidic substance after dissolution or dispersion of the proteinaceous impurities in the treating medium neutralizes the alkaline agent in the treating medium. This facilitates the recovery of the treated phytate in highly purified form and obviates the necessity for extensive washing which would otherwise be required to attain a comparable degree of purity.

The nature and amount of acidic material should be determined with a view to establishing a pH value at which the phytate will not dissolve and at which the proteinaceous impurities dissolved and dispersed in the treating medium will not precipitate. Generally, a pH value between 5.5 and 7 is satisfactory. However, in some cases, depending upon the history of the crude phytate, the dissolved or dispersed proteinaceous impurities may precipitate at a pH value which is near the lower value of the range specified. In such event, special care must be exercised not to carry the adjustment of the pH value too low. Due to the great variation in the proteinaceous impurities present in crude metal phytates derived from plant sources, it is not feasible to attempt to specify for each crude phytate, which may be treated in accordance with the invention, the exact minimal pH value below which adjustment should not be carried. Persons skilled in the art, however, will have no difficulty in determining through suitable preliminary tests what particular conditions of treatment are best suited to a particular crude metal phytate.

In general, any acidic material which will neutralize the alkaline agent in the treating medium may be employed. However, it is preferred to use an acidic material which forms a soluble salt with the alkaline agent in the treating medium, so that the reaction product resulting from neutralization of the alkaline agent may most readily be removed simply by washing with water. It is also preferred to use an acidic substance which does not form insoluble complexes with the dissolved or dispersed proteinaceous impurities. Apart from such considerations, any acidic material may be employed, acids such as hydrochloric and acetic being preferred.

If the history of the crude phytate is such as to warrant extensive treatment with the treating medium this may be employed in a series of successive treating operations, the treatment being repeated as often as may be required to effect the desired degree of purification.

The following examples which are intended as informative and typical only and not in a limited sense will further illustrate the invention, which is intended to be limited only in accordance with the scope of the appended claims:

*Example 1.*—Crude calcium phytate was prepared by adding lime to unincubated, light corn steepwater until the pH value thereof was about 5.2. The calcium phytate which precipitated from the steepwater was separated by filtration. The crude calcium phytate so obtained contained about 8.2% protein, dry basis, and had a moisture content of about 70%. The crude calcium phytate was immediately suspended in an aqueous solution of sodium hydroxide of such concentration that the concentration of sodium hydroxide in the resulting suspension was about 0.50 normal. The suspension was then heated to 180° F., being mechanically agitated during such treatment. Immediately thereafter hydrochloric acid was added to the suspension until the pH value thereof was approximately 7. The suspension was then filtered to separate the calcium phytate from the treating medium. The separated calcium phytate was washed several times with water and dried in conventional manner.

Such treatment resulted in the removal of 84% of the protein content of the crude calcium phytate.

*Example 2.*—The crude calcium phytate which was used in this example was obtained from corn steepwater as above described. However, instead of being subjected to purifying treatment immediately, it was first washed and dried in conventional manner until the moisture content was approximately 12%. It was then stored in this form for a period of 24 months. The protein content of the phytate so treated was 7.23%, dry basis. Sixty grams of this crude phytate was suspended in 400 milliliters of 1% sodium hydroxide solution The suspension was heated to boiling and boiled, at atmospheric pressure, for two minutes while being agitated constantly. The calcium phytate was separated from the treating medium by filtration and was washed with water to remove the alkali.

The protein content of the calcium phytate thus treated was reduced by 61.2%.

*Example 3.*—The conditions were the same as in Example 2 except that the concentration of the sodium hydroxide was 4%.

The reduction in the protein content of the calcium phytate thus treated was 76.5%.

*Example 4.*—The following table will illustrate the effect of the concentration of alkali in the treating medium. Sixty grams of crude calcium phytate from the same source as that in Example 2 was treated with various concentrations of sodium hydroxide as indicated in the table. The phytate was suspended in the sodium hydroxide solution and heated to boiling and held at the boiling point, at atmospheric pressure, for 2 minutes while being mechanically agitated. The phytate was separated from the suspension by filtration and then washed with water to remove the alkali.

*Table I*

| Sample No. | Volume (ml.) of NaOH Soln. | Concentration of NaOH in Per Cent | Reduction of Protein Content in Per Cent |
|---|---|---|---|
| 1 | 400 | 1.5 | 66.3 |
| 2 | 400 | 2.0 | 69.1 |
| 3 | 400 | 2.5 | 72.0 |
| 4 | 400 | 3.0 | 73.7 |
| 5 | 400 | 4.0 | 76.5 |
| 6 | 750 | 2.0 | 71.5 |

*Example 5.*—The following example will show the effect of aging and freezing on crude metal phytate treated according to this invention. Crude calcium phytate in the form indicated in the table was suspended in aqueous sodium hydroxide of such concentration that the concentration of the sodium hydroxide in the resulting suspension was 0.50 normal. The suspension was heated to boiling and boiled, at atmospheric pressure, for 2 minutes while being mechanically agitated. Immediately thereafter hydrochloric acid was added to the suspension until the pH value thereof was reduced to 7.0. The treated phytate was removed from the suspension by filtration and was washed with water and dried in conventional manner.

*Table II*

| Sample History | Moisture Content Per Cent | Reduction of Protein Content in Per Cent |
|---|---|---|
| Freshly precipitated wet cake | 74.5 | 70 |
| Same cake aged 1 day at room temperature | 74.5 | 63 |
| Fresh cake aged 1 day at −20° C | 74.5 | 59 |

*Example 6.*—The following example will show the efficiency of various alkaline agents, as compared to sodium hydroxide as a standard, on the reduction of the protein content of crude phytate treated in accordance with the process of the present invention. In each case the crude calcium phytate used was frozen hard in the wet state and aged for one day in this condition. The moisture content of the sample was approximately 72.6% and the protein content about 7.85%, the latter on dry basis. The crude phytate was suspended in an aqueous solution of the alkaline agent. The suspension was heated to the boiling point thereof, at atmospheric pressure, while being mechanically agitated. Immediately thereafter hydrochloric acid was added to the suspension until the pH value thereof was 7.0. The treated phytate was then removed from the suspension by filtration and was washed with water and dried in conventional manner. The table shows the kind and concentration of the several alkaline agents employed and the efficiency of each agent as related to a 1.0 molar solution of sodium hydroxide as a standard of 1.

*Table III*

| Alkaline Agent | Molar Concentration of Alkaline Substance in Suspension | Efficiency Related to 1 Molar NaOH as 1 |
|---|---|---|
| NaOH | 0.50 | 1.0 |
| KOH | 0.33 | 0.97 |
| Do | 0.50 | 1.19 |
| Do | 1.00 | 1.17 |
| Na$_2$CO$_3$ | 0.33 | 0.90 |
| Do | 0.50 | 0.97 |
| Do | 1.00 | 1.02 |
| Trimethylbenzyl ammonium hydroxide | 0.33 | 0.95 |
| Do | 0.50 | 0.96 |
| Do | 1.00 | 1.11 |

We claim:

1. The process of purifying, of proteinaceous impurities, crude phytates selected from the group consisting of calcium and barium phytates and derived from plant sources which comprises treating said phytates with an aqueous solution of a strongly alkaline agent, selected from the group consisting of sodium hydroxide, potassium hydroxide, sodium carbonate, potassium carbonate, trimethylbenzyl ammonium hydroxide and mixtures thereof, at elevated temperatures not substantially exceeding the boiling point of said solution at atmospheric pressure to dissolve or colloidally disperse said impurities, and thereafter, separating the phytates from the dissolved or colloidally dispersed impurities, the concentration of said alkaline agent in the solution contacting said phytates being sufficient to produce alkalinity equivalent to about 0.33 to about 1.0 normal sodium hydroxide solution.

2. The process of purifying, of protenaceous impurities, calcium phytate, precipitated from corn steepwater which comprises treating said phytate with aqueous solution of a strongly alkaline agent at elevated temperature not substantially exceeding the boiling point of said solution at atmospheric pressure to dissolve or colloidally disperse said impurities, and thereafter, separating the phytate from the dissolved or colloidally dispersed impurities, the alkaline agent being selected from the group consisting of sodium hydroxide, potassium hydroxide, sodium carbonate, potassium carbonate, trimethylbenzyl ammonium hydroxide and mixtures thereof, and the concentration of said alkaline agent in the solution contacting said phytate being sufficient to produce alkalinity equivalent to about 0.33 to about 1.0 normal sodium hydroxide solution.

3. The process of purifying, of proteinaceous impurities, calcium phytate, precipitated from corn steepwater which comprises suspending said phytate in an aqueous solution of sodium hydroxide, the concentration of sodium hydroxide in said suspension being within the range of about 0.33 to about 1.0 normal sodium hydroxide solution, boiling the resultant suspension at atmospheric pressure for several minutes to dissolve or colloidally disperse said impurities and separating the calcium phytate from the dissolved or colloidally dispersed impurities.

4. The process of purifying, of proteinaceous impurities, calcium phytate precipitated from corn steepwater by the addition of lime thereto which comprises suspending said phytate in an aqueous solution of sodium carbonate, the concentration of sodium carbonate in said suspension being about 0.33 to about 1.0 normal, and boiling the resulting suspension at atmospheric pressure for a period of about 1 to about 10 minutes to dissolve or colloidally disperse said impurities, and thereafter neutralizing the sodium carbonate in said suspension with hydrochloric acid and separating the phytate from the dissolved or colloidally dispersed impurities.

5. The process of purifying, of proteinaceous impurities, crude phytates obtained from plant sources by precipitation therefrom by means of compounds selected from the group consisting of calcium and barium compounds which comprises treating said phytates with an aqueous solution of a strongly alkaline agent from the group consisting of sodium hydroxide, potassium hydroxide, sodium carbonate, potassium carbonate, trimethylbenzyl ammonium hydroxide and mixtures thereof at elevated temperature not substantially exceeding the boiling point of said solution at atmospheric pressure to dissolve or colloidally disperse said impurities, and thereafter neutralizing said alkaline agent with an acid capable of forming a soluble salt with said agent but being non-reactive with respect to said proteinaceous materials, and separating the phytates from the dissolved or colloidally dispersed impurities, the concentration of said alkaline agent in the solution contacting said phytates being sufficient to produce alkalinity equivalent to about 0.33 to about 1.0 normal sodium hydroxide solution.

6. The process of purifying, of proteinaceous impurities, crude phytates selected from the group consisting of calcium and barium phytates and derived from plant sources which comprises treating said phytates with an aqueous solution of a strongly alkaline agent from the group consisting of sodium hydroxide, potassium hydroxide, sodium carbonate, potassium carbonate, trimethylbenzyl ammonium hydroxide and mixtures thereof at elevated temperature not substantially exceeding the boiling point of said solution at atmospheric pressure to dissolve or colloidally disperse said impurities, the concentration of said alkaline agent in the solution contacting said phytates being sufficient to produce alkalinity equivalent to about 0.33 to about 1.0 normal sodium hydroxide solution, and thereafter neutralizing said alkaline agent with an acid capable of forming a soluble salt with said agent but being non-reactive with respect to said proteinaceous impurities, and separating the phytates from the dissolved or colloidally dispersed impurities.

7. The process of purifying, of proteinaceous impurities, calcium phytate precipitated from corn steepwater by the addition of lime thereto which comprises suspending said phytate in an aqueous solution of sodium hydroxide, the concentration of sodium hydroxide in said suspension being about 0.33 to about 1.0 normal, and boiling the resulting suspension at atmospheric pressure for a period of about 1 to about 10 minutes to dissolve or colloidally disperse said impurities, and thereafter reducing with hydrochloric acid the pH value of said suspension to at least as low as 7.0 but not below the pH value at which the dissolved or dispersed impurities precipitate and said phytate dissolves, and separating the phytate from the dissolved or colloidally dispersed impurities.

8. The process of purifying, of proteinaceous impurities, calcium phytate precipitated from corn steepwater by the addition of lime thereto which comprises suspending said phytate in an aqueous solution of potassium hydroxide, the concentration of potassium hydroxide in said suspension being about 0.33 to about 1.0 normal, and boiling the resulting suspension at atmospheric pressure for a period of about 1 to about 10 minutes, to dissolve or colloidally disperse said impurities and thereafter neutralizing the potassium hydroxide in said suspeniosn with hydrochloric acid and separating the phytate from the dissolved or colloidally dispersed impurities.

HARRY GEHMAN.
WILLIAM HACH.

REFERENCES CITED

The following references are of record in the file of this patent:

UNITED STATES PATENTS

| Number | Name | Date |
|---|---|---|
| 1,610,854 | Fowler | Dec. 14, 1926 |
| 2,273,045 | Julian | Feb. 17, 1942 |
| 2,296,794 | Kruse | Sept. 22, 1942 |

FOREIGN PATENTS

| Number | Country | Date |
|---|---|---|
| 218,014 | Great Britain | June 30, 1924 |
| 793,988 | France | Dec. 2, 1935 |

OTHER REFERENCES

Bolkowski, "Chem. Zentr.," 1937 II, 2867.